US008717509B2

(12) United States Patent
Cheng et al.

(10) Patent No.: US 8,717,509 B2
(45) Date of Patent: May 6, 2014

(54) STEREOSCOPIC OPTICAL DEVICE AND METHOD OF MAKING THE SAME

(75) Inventors: Hsin-An Cheng, Hsin-Chu (TW); Liang-Yin Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 476 days.

(21) Appl. No.: 13/087,395

(22) Filed: Apr. 15, 2011

(65) Prior Publication Data

US 2012/0169979 A1 Jul. 5, 2012

(30) Foreign Application Priority Data

Dec. 30, 2010 (TW) ............................... 99147140 A

(51) Int. Cl.
*G02F 1/13363* (2006.01)
*G02F 1/1337* (2006.01)

(52) U.S. Cl.
USPC ............. 349/15; 349/124; 349/129; 349/136; 349/193

(58) Field of Classification Search
USPC ........... 349/15, 117, 124, 126, 128, 129, 187, 349/136, 193, 200; 359/465, 489.07; 348/57, 58; 430/321
See application file for complete search history.

(56) References Cited

U.S. PATENT DOCUMENTS 5,113,285 A * 5/1992 Franklin et al. ............... 359/465
5,818,560 A * 10/1998 Kouno et al. ................. 349/129
5,909,265 A 6/1999 Kim
6,055,103 A * 4/2000 Woodgate et al. ....... 359/489.07
6,128,059 A 10/2000 Nishiguchi
6,169,591 B1 1/2001 Kwon
7,075,607 B2 7/2006 Kim
2005/0128380 A1* 6/2005 Zieba et al. ..................... 349/96
2005/0151908 A1* 7/2005 Nomura et al. ............... 349/136
2006/0126156 A1* 6/2006 Evans et al. ................... 359/320
2009/0226629 A1* 9/2009 Yen et al. ...................... 427/510
2010/0238546 A1* 9/2010 Hsu et al. ...................... 359/465

FOREIGN PATENT DOCUMENTS

TW 200825577 6/2008
TW 1315423 10/2009

* cited by examiner

*Primary Examiner* — Dung Nguyen
*Assistant Examiner* — Tai Duong
(74) *Attorney, Agent, or Firm* — Winston Hsu; Scott Margo

(57) ABSTRACT

A stereoscopic optical device includes a substrate, an alignment film and a liquid crystal layer. The alignment film includes at least one first region and at least one second region. The liquid crystal layer, disposed on the alignment film, includes first liquid crystal molecules and second liquid crystal molecules. The first liquid crystal molecules correspond to the first region of the alignment film and have a first pre-tilt angle, the second liquid crystal molecules correspond to the second region of the alignment film and have a second pre-tilt angle. The fast axis of the first liquid crystal molecules and the fast axis of the second crystal molecules substantially face the same direction, and the slow axis of the first liquid crystal molecules and the slow axis of the second liquid crystal molecules substantially face in the same direction.

8 Claims, 6 Drawing Sheets

30
36
362 361 362 361 362 361
342 341 342 341 342 341
34
32
42
40

30
361(36)
F1 S1 341
F2 S2 342
F1 S1 341
F2 S2 342
F1 S1 341
F2 S2 342
34
362(36)

STEREOSCOPIC OPTICAL DEVICE AND METHOD OF MAKING THE SAME

BACKGROUND OF THE INVENTION

1. Field of the Invention

The present invention relates to a stereoscopic optical device and a method of making the same, and more particularly, to a stereoscopic optical device with an alignment film, which has an identical aligning direction of fast axis for liquid crystal molecules in different regions, an identical aligning direction of slow axis for liquid crystal molecules in different regions, and different pre-tilt effects on liquid crystal molecules in different regions, and a method of making a stereoscopic optical device without using patterned masks to make different regions of the alignment film characterized with different pre-tilt effect on liquid crystal molecules.

2. Description of the Prior Art

The principle of the stereoscopic display technology includes respectively delivering different images to a left eye and a right eye of a viewer, making the viewer feeling the gradation and the depth of the images, and generating the stereoscopic effect by analyzing and overlapping images separately received by the left eye and the right eye in the cerebrum of the viewer.

Please refer to FIG. 1. FIG. 1 is a schematic diagram illustrating a conventional stereoscopic optical device. As shown in FIG. 1, the conventional stereoscopic optical device 10 includes a substrate 12, an alignment film 14 disposed on the substrate 12, a quarter wavelength phase retardation film 16 disposed on the alignment film 14, and a patterned phase retardation film 18 disposed on the phase retardation film 16. The quarter wavelength phase retardation film 16 and the patterned phase retardation film 18 are respectively a liquid crystal layer, and the patterned phase retardation film 18 includes a plurality of alternately arranged first regions 181 and second regions 182. The first region 181 has a half wavelength phase retardation effect, and the second region 182 does not have phase retardation effects.

The stereoscopic optical device 10 is disposed on a display surface of a display panel, such as a liquid crystal display panel 20. After passing through the stereoscopic optical device 10, the linear polarized light generated from a polarizer 22 above the liquid crystal display panel 20 may pass through the first region 181 of the patterned phase retardation film 18 and the second region 182 of the patterned phase retardation film 18 and become different circularly polarized lights, such as left-hand circular polarized light and right-hand circular polarized light. According to the different circular polarized light, the left eye and the right eye of the viewer wearing polarized glasses may receive different images and the stereoscopic effect may then be generated.

However, in the conventional stereoscopic optical device 10, two pieces of phase retardation films, which are the quarter wavelength phase retardation film 16 and the patterned phase retardation film 18, have to be employed, and that may lead to thicker stereoscopic optical devices, higher cost, and worse optical properties. Besides, the cost and the complexity of the manufacturing process may be further increased, because masks have to be employed to define patterns of the patterned phase retardation film 18.

SUMMARY OF THE INVENTION

It is one of the objectives of the present invention to provide a stereoscopic optical device and a method of making the same to improve optical properties of the stereoscopic optical device and make the cost and the manufacturing complexity of the stereoscopic optical device lowered.

According to a preferred embodiment of the present invention, a stereoscopic optical device includes a substrate, an alignment film and a liquid crystal layer. The alignment film is disposed on the substrate. The alignment film includes at least a first region and at least a second region. The first region of the alignment film has a first pre-tilt effect and the second region of the alignment film has a second pre-tilt effect, which is different from the first pre-tilt effect. The liquid crystal layer is disposed on the alignment film and includes a plurality of first liquid crystal molecules and a plurality of second liquid crystal molecules. The first liquid crystal molecules correspond to the first region of the alignment film and have a first pre-tilt angle, and the second liquid crystal molecules correspond to the second region of the alignment film and have a second pre-tilt angle, which is different from the first pre-tilt angle. Additionally, a fast axis of the first liquid crystal molecules and a fast axis of the second liquid crystal molecules substantially face an identical direction, and a slow axis of the first liquid crystal molecules and a slow axis of the second liquid crystal molecules face an identical direction.

According to another preferred embodiment of the present invention, a method of making a stereoscopic optical device includes the following steps. A substrate is provided. An alignment film is formed on the substrate. A first region of the alignment film is characterized with a first pre-tilt effect, and a second region of the alignment film is characterized with a second pre-tilt effect, which is different from the first pre-tilt effect. A liquid crystal layer is formed on the alignment film, and the liquid crystal layer includes a plurality of first liquid crystal molecules and a plurality of second liquid crystal molecules. The first liquid crystal molecules correspond to the first region of the alignment film and have a first pre-tilt angle, and the second liquid crystal molecules correspond to the second region of the alignment film and have a second pre-tilt angle, which is different from the first pre-tilt angle. Additionally, a fast axis of the first liquid crystal molecules and a fast axis of the second liquid crystal molecules substantially face an identical direction, and a slow axis of the first liquid crystal molecules and a slow axis of the second liquid crystal molecules face an identical direction.

According to the stereoscopic optical device and the method of making the same in the present invention, the patterned phase retardation film may be realized by only a single liquid crystal layer. The purposes of process simplification, manufacturing cost down, and stereoscopic optical property enhancement may then be achieved.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to skilled users in the technology of the present invention, preferred embodiments will be detailed as follows. The preferred embodiments of the present invention are illustrated in the accompanying drawings with numbered elements to elaborate the contents and effects to be achieved.

Figure 1:
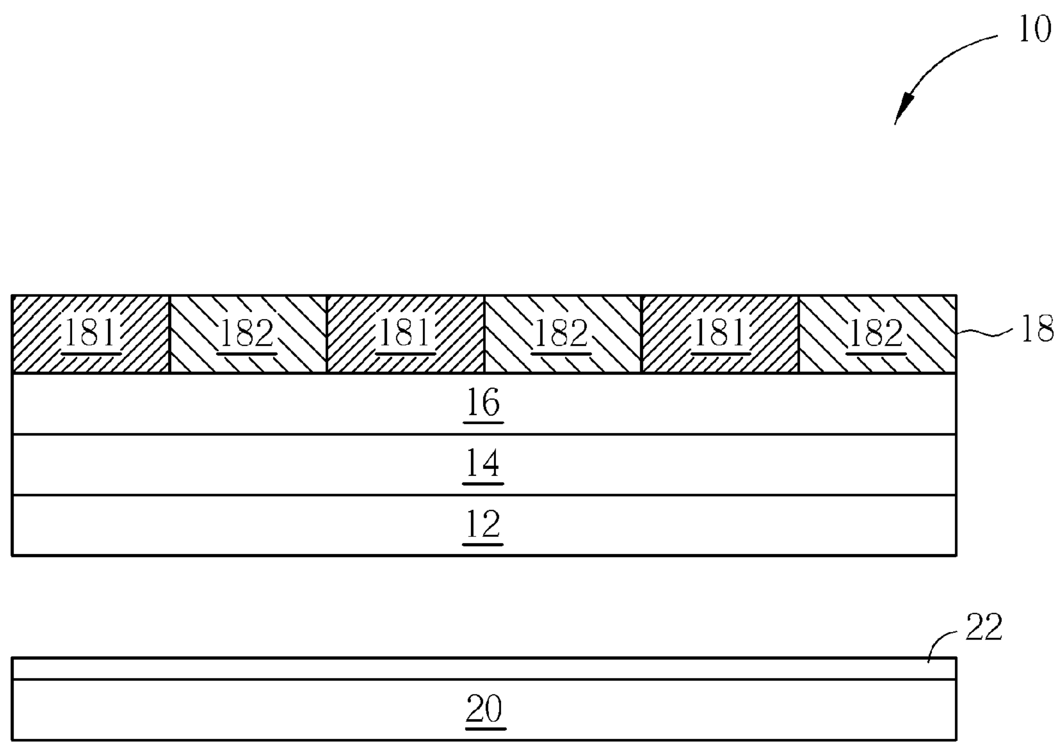
FIG. 1 is a schematic diagram illustrating a conventional stereoscopic optical device.
Figure 2:
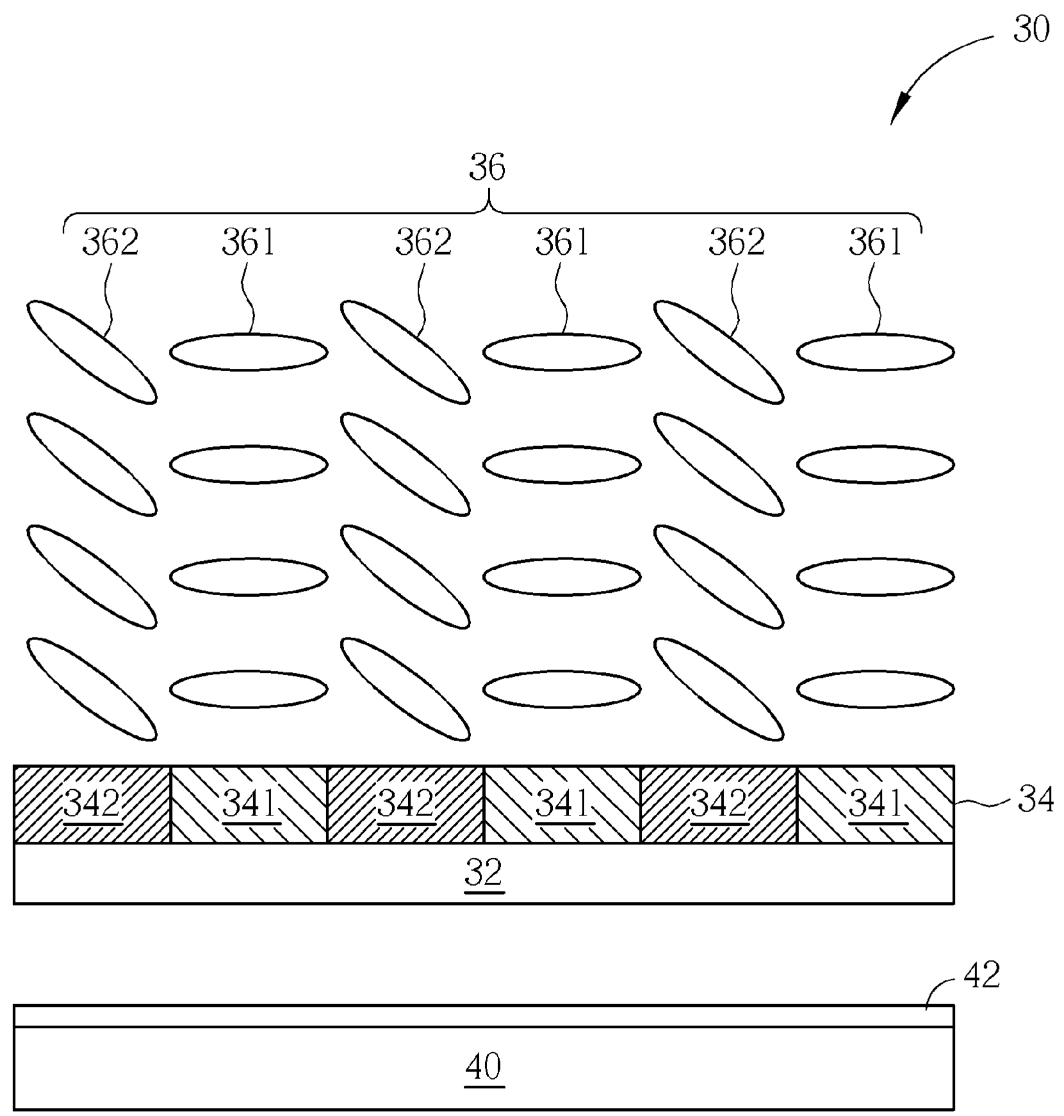
FIG. 2 is a schematic diagram illustrating a cross-sectional view of a stereoscopic optical device according to a preferred embodiment of the present invention.
Figure 3:
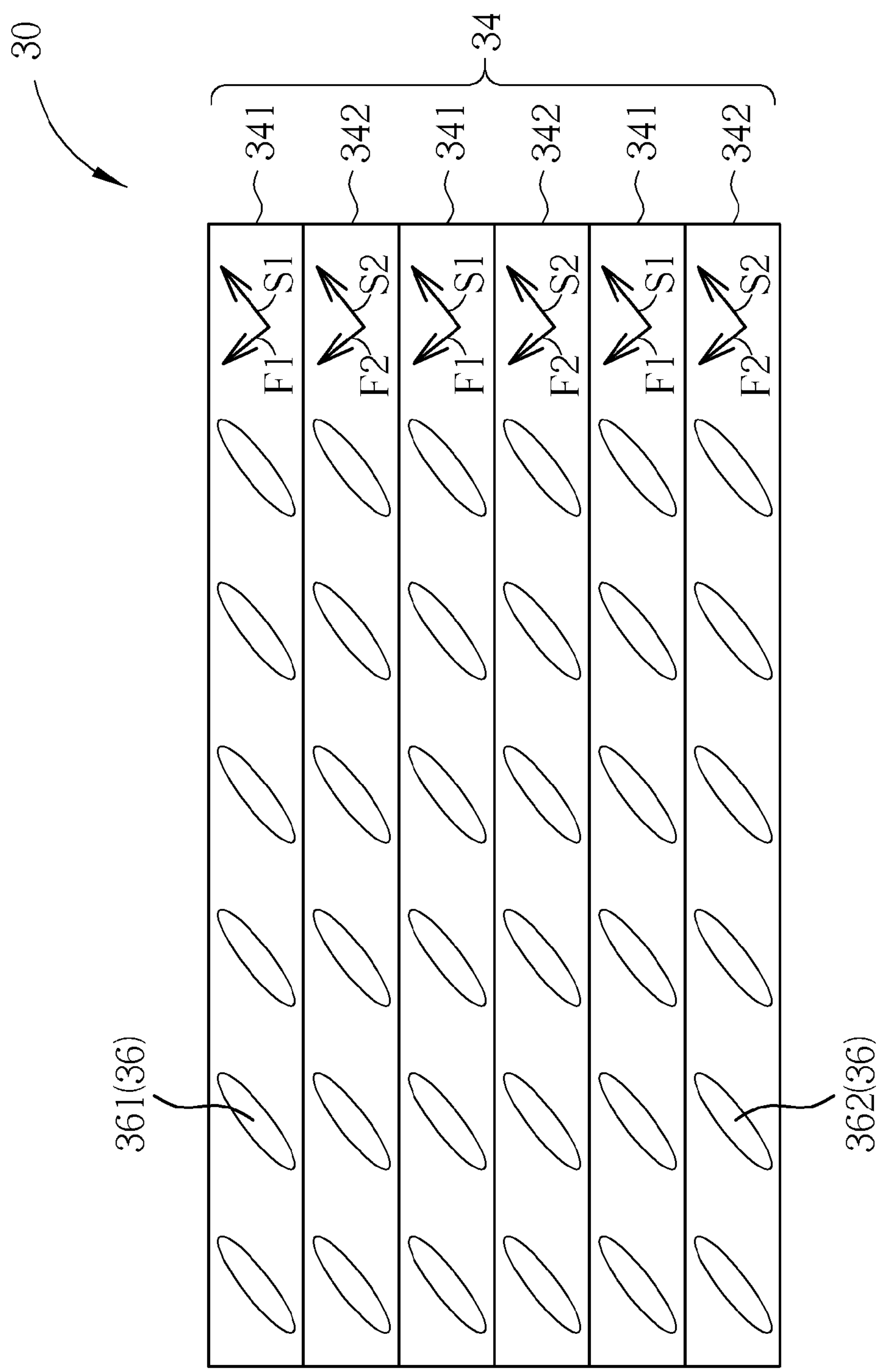
FIG. 3 is a schematic diagram illustrating a top view of a stereoscopic optical device according to a preferred embodiment of the present invention.

Please refer to FIG. 2 and FIG. 3. FIG. 2 is a schematic diagram illustrating a cross-sectional view of a stereoscopic optical device according to a preferred embodiment of the present invention. FIG. 3 is a schematic diagram illustrating a top view of a stereoscopic optical device according to a preferred embodiment of the present invention. As shown in FIG. 2 and FIG. 3, in this embodiment, a stereoscopic optical device 30 includes a substrate 32 (not shown in FIG. 3), an alignment film 34 disposed on the substrate 32, and a liquid crystal layer 36 disposed on the alignment film 34. The substrate 32 may be a flexible substrate such as a plastic substrate, or a hard substrate such as a glass substrate, but the present invention is not limited to this. The alignment film 34 includes at least a first region 341 and at least a second region 342. The first region 341 of the alignment film 34 has a first pre-tilt effect, and the second region 342 of the alignment film 34 has a second pre-tilt effect, which is different from the first pre-tilt effect. The liquid crystal layer 36 includes a plurality of first liquid crystal molecules 361 and a plurality of second liquid crystal molecules 362. The first liquid crystal molecules 361 correspond to the first region 341 of the alignment film 34, and the second liquid crystal molecules 362 correspond to the second region 342 of the alignment film 34. In this embodiment, the alignment film 34 substantially has identical fast axis/slow axis effects on the first liquid crystal molecules 361 and the second liquid crystal molecules 362, making a fast axis of the first liquid crystal molecules 361 and a fast axis of the second liquid crystal molecules 362 aligned in an identical direction, and making a slow axis of the first liquid crystal molecules 361 and a slow axis of the second liquid crystal molecules 362 aligned in an identical direction. In other words, because the fast axis and the slow axis of the liquid crystal molecules are perpendicular to each other, the fast axis F1 of the first liquid crystal molecules 361 and the fast axis F2 of the second liquid crystal molecules 362 substantially face an identical direction, and the slow axis S1 of the first liquid crystal molecules 361 and the slow axis S2 of the second liquid crystal molecules 362 substantially face an identical direction (as shown in FIG. 3). Even the alignment film 34 has the same fast axis/slow axis effects on the first liquid crystal molecules 361 and the second liquid crystal molecules 362, the pre-tilt effect on the first liquid crystal molecules 361 is different from the pre-tilt effect on the second liquid crystal molecules 362. The first region 341 of the alignment film 34 and the second region 342 of the alignment film 34 may be made of identical materials or different materials. As shown in FIG. 2, the first liquid crystal molecules 361 corresponding to the first region 341 of the alignment film 34 may have a first pre-tilt angle because the first region 341 of the alignment film 34 has the first pre-tilt effect, and the second liquid crystal molecules 362 corresponding to the second region 342 of the alignment film 34 may have a second pre-tilt angle different from the first pre-tilt angle because the second region 342 of the alignment film 34 has the second pre-tilt effect. Under the same alignment direction of the fast axis of the liquid crystal molecules and the same alignment direction of the slow axis of the liquid crystal molecules, the pre-tilt angle of the liquid crystal molecules may have a specific relationship with the phase retardation effect. In other words, the first liquid crystal molecules 361 with the first pre-tilt angle may generate a first phase retardation effect, and the second liquid crystal molecules 362 with the second pre-tilt angle may generate a second phase retardation effect. The first phase retardation effect is different from the second phase retardation effect because the first pre-tilt angle is different from the second pre-tilt angle.

Figure 4:
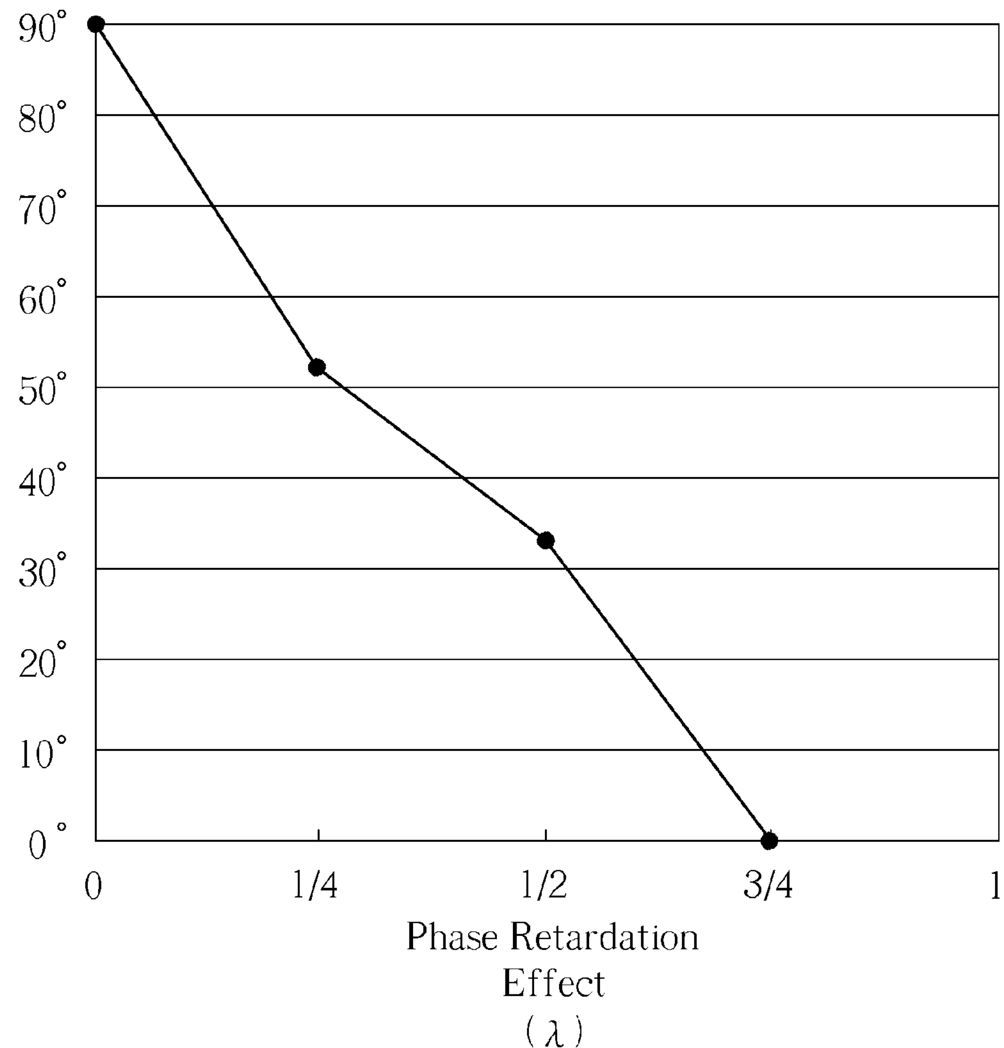
FIG. 4 is a schematic diagram illustrating the relationship between the pre-tilt angles and the phase retardation effect of the liquid crystal molecules.

Please refer to FIG. 4. FIG. 4 is a schematic diagram illustrating the relationship between the pre-tilt angles and the phase retardation effect of the liquid crystal molecules. As shown in FIG. 4, under a condition of same spacing and refractive anisotropism of the liquid crystal, the pre-tilt angle of the liquid crystal molecules substantially has a reverse relationship with the phase retardation effect. For example, the liquid crystal molecules may have a nearly three-fourths wavelength phase retardation effect when the pre-tilt angle of the liquid crystal molecules is about 0 degree. The liquid crystal molecules may have a nearly half wavelength phase retardation effect when the pre-tilt angle of the liquid crystal molecules is about 33 degrees. The liquid crystal molecules may have a nearly quarter wavelength phase retardation effect when the pre-tilt angle of the liquid crystal molecules is about 52 degrees. The liquid crystal molecules do not have any phase retardation effect when the pre-tilt angle of the liquid crystal molecules is about 90 degrees.

In the embodiment shown in FIG. 2 and FIG. 3, under the same alignment direction of the fast axis of the liquid crystal molecules and the same alignment direction of the slow axis of the liquid crystal molecules, the first pre-tilt angle of the first liquid crystal molecules 361 may be set to be 0 degree, and then the first phase retardation effect of the first liquid crystal molecules 361 is a three-fourths wavelength phase retardation effect. The second pre-tilt angle of the second liquid crystal molecules 362 may be set to be 52 degrees, and then the second phase retardation effect of the second liquid crystal molecules 362 is a quarter wavelength phase retardation effect, i.e. a three-fourths wavelength phase retardation effect may be generated on light passing though the first liquid crystal molecules 361, a quarter wavelength phase retardation effect may be generated on light passing though the second liquid crystal molecules 362, and even the phase retardation amounts are different in the first liquid crystal molecules 361 corresponding to the first region 341 and the second liquid crystal molecules 362 corresponding to the second region 342, the alignment directions of the fast axis/slow axis of the first liquid crystal molecules 361 and the second liquid crystal molecules 362 are identical. In other words, in the present invention, different directions of the pre-tilt angle are applied, under the same direction of the fast axis of the liquid crystal molecules and the same direction of the slow axis of the liquid crystal molecules, to make the liquid crystal molecules (the first liquid crystal molecules 361/the second liquid crystal molecules 362), which are corresponding to two different regions (the first region 341/the second region 342), characterized with different amounts (value) of phase retardation. For example, the phase retardation amount (value) of the first region 341 is positive three-fourths wavelength, and the phase retardation amount (value) of the second region 342 is positive quarter wavelength. The first phase retardation effect of the first liquid crystal molecules 361 corresponding to the first region 341 and the second phase retardation effect of the second liquid crystal molecules 362 corresponding to the second region 342 are not limited to this embodiment and may be adjusted as needed. For example, in another preferred embodiment of the present invention, the first phase retardation effect may be a half wavelength phase retardation effect, the second phase retardation effect may be a zero-order phase retardation effect, but the alignment directions of the fast axis of the liquid crystal molecules (the first liquid crystal molecules 361/the second liquid crystal molecules 362) corresponding to two different regions (the first region 341/the second region 342) are identical, and the alignment directions of the slow axis of the liquid crystal molecules (the first liquid crystal molecules 361/the second liquid crystal molecules 362) corresponding to two different regions (the first region 341/the second region 342) are identical. The positive/negative condition of the phase retardation amount (value) may be identical too. In other words, the two different phase retardation effects in the present invention are effects with different amounts (values) of phase retardation, and the positive/negative conditions are identical (both of them are positive or both of them are negative, for example) or one of them equals to zero. For example, the first phase retardation effect may be a positive half wavelength phase retardation effect, and the second phase retardation effect may be a zero-order phase retardation effect; the first phase retardation effect may be a positive quarter wavelength phase retardation effect, and the second phase retardation effect may be a positive three-fourths wavelength phase retardation effect; or the first phase retardation effect may be a negative quarter wavelength phase retardation effect, and the second phase retardation effect may be a negative three-fourths wavelength phase retardation effect. It is worth mentioning that the first phase retardation effect and the second phase retardation effect may be interchanged or adjusted as needed, and the first phase retardation effect and the second phase retardation effect are not limited to the above-mentioned approaches.

As shown in FIG. 2, the stereoscopic optical device of this embodiment may be disposed on a display panel, such as a liquid crystal display panel 40, and the liquid crystal display panel 40 may then provide stereoscopic display effect. For example, under the condition that the first phase retardation effect is a positive three-fourths wavelength phase retardation effect and the second phase retardation effect is a positive quarter wavelength phase retardation effect, light generated from the liquid crystal display panel 40 may pass through the top polarizer 42 and become linear polarized light, a part of the linear polarized light may generate a three-fourths wavelength phase retardation and become such as left-hand circular polarized light after passing through the first liquid crystal molecules 361 of the stereoscopic optical device 30, and another part of the linear polarized light may generate a quarter wavelength phase retardation and become such as right-hand circular polarized light after passing through the second liquid crystal molecules 362 of the stereoscopic optical device 30. And then a left eye and a right eye of a viewer wearing polarized glasses may receive different images and the stereoscopic effect may then be generated. According to the same principle, under the situation that the first phase retardation effect is a positive half quarter wavelength phase retardation effect and the second phase retardation effect is a zero-order phase retardation effect, the left eye and the right eye of the viewer wearing polarized glasses may receive different images and the stereoscopic effect may then be generated. It is worth noticing that the alignment directions of the fast axes/the slow axes of both the first liquid crystal molecules 361, which generate the right-hand circular polarized light, and the second liquid crystal molecules 362, which generate the left-hand circular polarized light, are identical.

According to the above description, in the present invention, the stereoscopic optical device 30 may generate patterned phase retardation effect by only one phase retardation layer (the liquid crystal layer 36), and provides stereoscopic display effect for the liquid crystal display panel 40.

Figure 5:
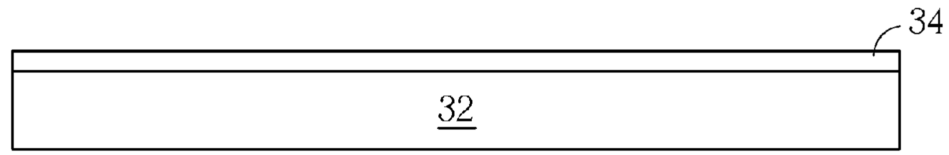
FIGS. 5-7 are schematic diagrams illustrating a method of making a stereoscopic optical device according to a first preferred embodiment of the present invention.
Figure 6:
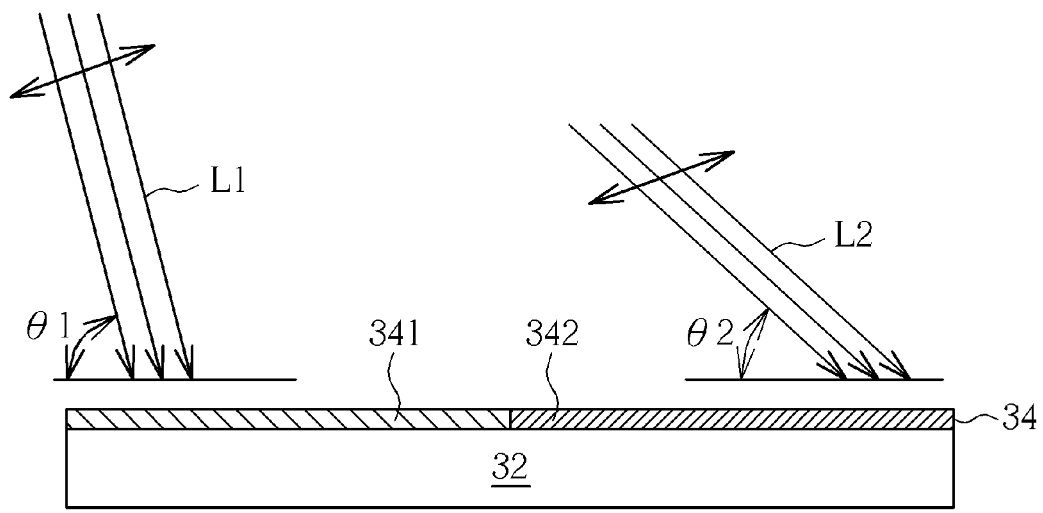
Figure 7:
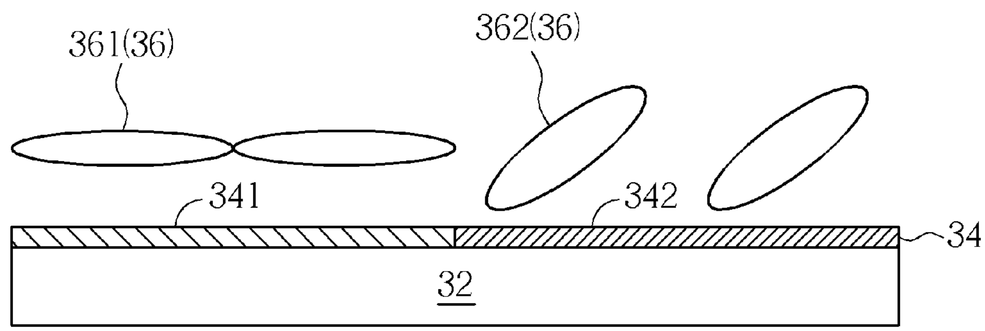

Please refer to FIG. 5-7, FIG. 5-7 are schematic diagrams illustrating a method of making a stereoscopic optical device according to a first preferred embodiment of the present invention. As shown in FIG. 5, firstly, a substrate 32 is provided, and an alignment film 34 is formed on the substrate 32. The alignment film 34 may be formed by a spray coating approach, but the present invention is not limited to this. As shown in FIG. 6, a first region 341 of the alignment film 34 is characterized with a first pre-tilt effect, and a second region 342 of the alignment film 34 is characterized with a second pre-tilt effect, which is different from the first pre-tilt effect. In this embodiment, a method of making the first region 341 of the alignment film 34 characterized with the first pre-tilt effect and making the second region 342 of the alignment film 34 characterized with the second pre-tilt effect, which is different from the first pre-tilt effect, includes the following steps. A first light source L1 is used to irradiate the first region 341 of the alignment film 34 in order to make the first region 341 of the alignment film 34 characterized with the first pre-tilt effect, and a second light source L2 is used to irradiate the second region 342 of the alignment film 34 in order to make the second region 342 of the alignment film 34 characterized with the second pre-tilt effect. Preferably, the first light source L1 and the second light source L2 are light sources with an identical polarizing direction, such as ultraviolet light sources with the identical polarizing direction, but the present invention is not limited to this. In addition, the first light source L1 irradiates the first region 341 of the alignment film 34 along a first incident angle θ1, and the second light source L2 irradiates the second region 342 of the alignment film 34 along a second incident angle θ2. In this embodiment, the first region 341 and the second region 342 of the alignment film 34 are made of identical materials, such as photo sensitive materials. After respectively being irradiated by the first light source L1 and the second light source L2, the first region 341 and the second region 342 may make liquid crystal molecules, which are formed subsequently, characterized with identical fast axis/slow axis direction. The first region 341 and the second region 342 have identical alignment effect on the liquid crystal molecules, but the first region 341 and the second region 342 have different pre-tilt effects on the liquid crystal molecules.

As shown in FIG. 7, a liquid crystal layer 36 is formed subsequently on the alignment film 34. The liquid crystal layer 36 includes a plurality of first liquid crystal molecules 361 and a plurality of second liquid crystal molecules 362. The first liquid crystal molecules 361 correspond to the first region 341 of the alignment film 34, and the second liquid crystal molecules 362 correspond to the second region 342 of the alignment film 34. The first region 341 and the second region 342 of the alignment film 34 have the same fast axis/slow axis direction effect on the first liquid crystal molecules 361 and the second liquid crystal molecules 362, and therefore, the first liquid crystal molecules 361 and the second liquid crystal molecules 362 are aligned in an identical direction, i.e., the fast axis and/or the slow axis of the first liquid crystal molecules 361 are identical with the fast axis and/or the slow axis of the second liquid crystal molecules 362. The first pre-tilt effect, which is generated by the first region 341 of the alignment film 34, on the first liquid crystal molecules 361 is different from the second pre-tilt effect, which is generated by the second region 342 of the alignment film 34, on the second liquid crystal molecules 362. Therefore, the first liquid crystal molecules 361 may have a first pre-tilt angle and generate a first phase retardation effect on light, and the second liquid crystal molecules 362 may have a second pre-tilt angle, which is different from the first pre-tilt angle, and generate a second phase retardation effect on light, i.e., the amount (value) of the first phase retardation is different from the amount (value) of the second phase retardation, but the positive/negative conditions may be the same.

Figure 8:
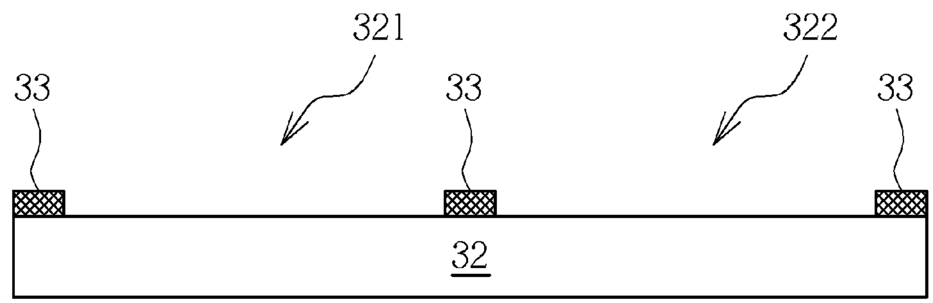
FIGS. 8-10 are schematic diagrams illustrating a method of making a stereoscopic optical device according to a second preferred embodiment of the present invention.
Figure 9:
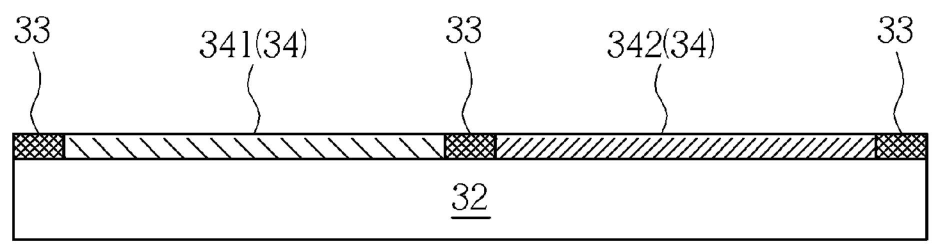
Figure 10:
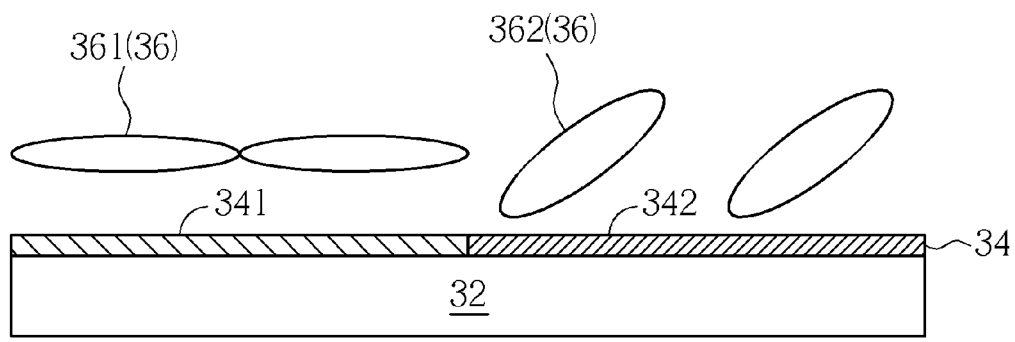

Please refer to FIGS. 8-10. FIGS. 8-10 are schematic diagrams illustrating a method of making a stereoscopic optical device according to a second preferred embodiment of the present invention. As shown in FIG. 8, firstly, a substrate 32 is provided. An isolation pattern 33 is then formed on the substrate 32 to define a first space 321 and a second space 322 on the substrate 32. The isolation pattern 33 may be such as a black matrix pattern, but the present invention is not limited to this. As shown in FIG. 9, a first alignment material is then formed in the first space 321 on the substrate 32 to form the first region 341 of the alignment film 34, and a second alignment material is formed in the second space 322 on the substrate 32 to form the second region 342 of the alignment film 34. The first alignment material and the second alignment material may be formed by such as an inkjet printing approach, but the present invention is not limited to this. Then a rubbing process is executed on the alignment film 34 to form an identical alignment direction on the first region 341 and the second region 342 of the alignment film 34, and the first region 341 and the second region 342 may have an identical alignment effect on the liquid crystal molecules formed subsequently. But the pre-tilt effect of the first region 341 is different from the pre-tilt effect of the second region 342, because the first alignment material is different from the second alignment material. As shown in FIG. 10, a liquid crystal layer 36 is then formed on the alignment film 34. The liquid crystal layer 36 includes a plurality of first liquid crystal molecules 361 and a plurality of second liquid crystal molecules 362. The first liquid crystal molecules 361 correspond to the first region 341 of the alignment film 34, and the second liquid crystal molecules 362 correspond to the second region 342 of the alignment film 34. The first region 341 and the second region 342 of the alignment film 34 have the same fast axis/slow axis direction effect on the first liquid crystal molecules 361 and the second liquid crystal molecules 362, and therefore, the first liquid crystal molecules 361 and the second liquid crystal molecules 362 are aligned in an identical direction, i.e., the fast axis and/or the slow axis of the first liquid crystal molecules 361 are identical with the fast axis and/or the slow axis of the corresponded second liquid crystal molecules 362. The first pre-tilt effect, which is generated by the first region 341 of the alignment film 34, on the first liquid crystal molecules 361 is different from the second pre-tilt effect, which is generated by the second region 342 of the alignment film 34, on the second liquid crystal molecules 362. Therefore, the first liquid crystal molecules 361 may have the first pre-tilt angle and generate the first phase retardation effect on light, and the second liquid crystal molecules 362 may have the second pre-tilt angle, which is different from the first pre-tilt angle, and generate the second phase retardation effect on light, i.e., the amount (value) of the first phase retardation is different from the amount (value) of the second phase retardation, but the alignment directions of the fast axes/slow axes of the liquid crystal molecules (the first liquid crystal molecules 361/the second liquid crystal molecules 362) corresponding to two different regions (the first region 341/the second region 342) are identical. The positive/negative condition of the phase retardation amount (value) may be identical too.

According to the above description, in the method of making the stereoscopic optical device in the present invention, lights with different incident angles may be employed to irradiate the alignment film to form the first region and the second region of the alignment film, or different materials may be employed to form the first region and the second region of the alignment film, for making the first pre-tilt angel of the first liquid crystal molecules corresponding to the first region different from the second pre-tilt angle of the second liquid crystal molecules corresponding to the second region. Under the condition that the first pre-tilt angle is different from the second pre-tilt angle, even the directions of the fast axes/slow axes of the first liquid crystal molecules and the second liquid crystal molecules are identical, i.e., the positive/negative conditions of the amounts (values) of the phase retardations are identical, the amount (value) of the first phase retardation of the first liquid crystal molecules may be different from the amount (value) of the second phase retardation of the second liquid crystal molecules. The first phase retardation effect may be such as a positive three-fourths wavelength phase retardation effect, and the second phase retardation effect may be a positive quarter wavelength phase retardation effect, but the first and the second phase retardation effect are not limited to this and may be changed according to different design purposes of the stereoscopic optical device. For example, the first phase retardation effect may be a positive half wavelength phase retardation effect or a negative half wavelength phase retardation effect, and the second phase retardation effect may be a zero-order phase retardation effect; or the first phase retardation effect may be a negative quarter wavelength phase retardation effect, and the second phase retardation effect may be a negative three-fourths wavelength phase retardation effect.

To summarize the above description, the patterned phase retardation film may be realized by only a single liquid crystal layer. The purposes of process simplification, manufacturing cost down, and stereoscopic optical property enhancement may then be achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stereoscopic optical device, comprising:

a substrate;

an alignment film disposed on the substrate, the alignment film comprising at least one first region and at least one second region, wherein the first region of the alignment film has a first pre-tilt effect and the second region of the alignment film has a second pre-tilt effect different from the first pre-tilt effect; and a liquid crystal layer disposed on the alignment film, the liquid crystal layer comprising a plurality of first liquid crystal molecules and a plurality of second liquid crystal molecules, wherein the first liquid crystal molecules correspond to the first region of the alignment film and have a first pre-tilt angle, the second liquid crystal molecules correspond to the second region of the alignment film and have a second pre-tilt angle different from the first pre-tilt angle, the first liquid crystal molecules have a first phase retardation effect and the second liquid crystal molecules have a second phase retardation effect, wherein a fast axis of the first liquid crystal molecules and a fast axis of the second liquid crystal molecules substantially face an identical direction, and a slow axis of the first liquid crystal molecules and a slow axis of the second liquid crystal molecules face an identical direction, and wherein the first phase retardation effect is a positive three-fourths (+¾) wavelength phase retardation effect and the second phase retardation effect is a positive quarter (+¼) wavelength phase retardation effect;

the first phase retardation effect is a negative quarter (−¼) wavelength phase retardation effect and the second phase retardation effect is a negative three-fourths (−¾) wavelength phase retardation effect; or the first phase retardation effect is a positive half (+½) wavelength phase retardation effect or a negative half wavelength phase retardation effect, and the second phase retardation effect is a zero-order phase retardation effect.

2. The stereoscopic optical device of claim 1, wherein the first region of the alignment film and the second region of the alignment film are made of a same material.

3. The stereoscopic optical device of claim 1, wherein the first region of the alignment film and the second region of the alignment film are made of different materials.

4. A method of forming a stereoscopic optical device, comprising:

providing a substrate;

forming an alignment film on the substrate, making a first region of the alignment film characterized with a first pre-tilt effect, and making a second region of the alignment film characterized with a second pre-tilt effect different from the first pre-tilt effect; and forming a liquid crystal layer on the alignment film, the liquid crystal layer comprising a plurality of first liquid crystal molecules and a plurality of second liquid crystal molecules, wherein the first liquid crystal molecules correspond to the first region of the alignment film and have a first pre-tilt angle, the second liquid crystal molecules correspond to the second region of the alignment film and have a second pre-tilt angle different from the first pre-tilt angle, the first liquid crystal molecules have a first phase retardation effect and the second liquid crystal molecules have a second phase retardation effect, wherein a fast axis of the first liquid crystal molecules and a fast axis of the second liquid crystal molecules substantially face an identical direction, and a slow axis of the first liquid crystal molecules and a slow axis of the second liquid crystal molecules face an identical direction, and wherein the first phase retardation effect is a positive three-fourths (+¾) wavelength phase retardation effect and the second phase retardation effect is a positive quarter (+¼) wavelength phase retardation effect;

the first phase retardation effect is a negative quarter (−¼) wavelength phase retardation effect and the second phase retardation effect is a negative three-fourths (−¾) wavelength phase retardation effect; or the first phase retardation effect is a positive half (+½) wavelength phase retardation effect or a negative half wavelength phase retardation effect, and the second phase retardation effect is a zero-order phase retardation effect.

5. The method of forming the stereoscopic optical device in claim 4, wherein steps of making the first region of the alignment film characterized with the first pre-tilt effect and making the second region of the alignment film characterized with the second pre-tilt effect different from the first pre-tilt effect comprise:

irradiating the first region of the alignment film with a first light source to make the first region of the alignment film characterized with the first pre-tilt effect; and irradiating the second region of the alignment film with a second light source to make the second region of the alignment film characterized with the second pre-tilt effect.

6. The method of forming the stereoscopic optical device in claim 5, wherein the first light source and the second light source have an identical polarizing direction, the first region of the alignment film is irradiated with the first light source along a first incident angle, and the second region of the alignment film is irradiated with the second light source along a second incident angle.

7. The method of forming the stereoscopic optical device in claim 6, wherein the first light source and the second light source are ultraviolet light sources with the identical polarizing direction.

8. The method of forming the stereoscopic optical device in claim 4, wherein steps of forming the alignment film on the substrate, making the first region of the alignment film characterized with the first pre-tilt effect, and making the second region of the alignment film characterized with the second pre-tilt effect different from the first pre-tilt effect comprise:

forming an isolation pattern on the substrate to define a first space and a second space on the substrate;

forming a first alignment material in the first space on the substrate to form the first region of the alignment film;

forming a second alignment material in the second space on the substrate to form the second region of the alignment film; and rubbing the alignment film to render the alignment film of the first region and the alignment film of the second region an identical aligning direction, wherein the first alignment material is different from the second alignment material for making the first region of the alignment film characterized with the first pre-tilt effect, and making the second region of the alignment film characterized with the second pre-tilt effect.

* * * * *